United States Patent [19]

Kanbara et al.

[11] 3,854,966

[45] Dec. 17, 1974

[54] CASTABLE REFRACTORIES FOR THE USE OF AN IMPELLER TO STIR MOLTEN PIG IRON TO WHICH AN ALKALINE ADDITIVE IS ADDED

[75] Inventors: Kenjiro Kanbara; Satoshi Nagai; Hiroki Yanagi, all of Hyogo, Japan

[73] Assignee: Nippon Steel Corporation, Tokyo, Japan

[22] Filed: Dec. 26, 1972

[21] Appl. No.: 318,676

[30] Foreign Application Priority Data

Dec. 29, 1971 Japan.................................. 47-2839

[52] U.S. Cl........................ 106/64, 106/66, 106/104
[51] Int. Cl............................................ C04b 35/02
[58] Field of Search...................... 106/64, 66, 104

[56] References Cited
UNITED STATES PATENTS 3,226,240  12/1965  Crowley.............................. 106/64
3,718,489  2/1973  Crookston et al.................... 106/64

*Primary Examiner*—J. Poer
*Attorney, Agent, or Firm*—Toren, McGeady & Stanger

[57] ABSTRACT

Castable refractories for use as an impeller to stir molten pig iron to which an alkaline additive is added comprising chamotte, aluminous cement and optionally chromium oxide, said chamotte being obtained by burning fire clay consisting chiefly of kaolinite, and the amounts of said aluminous cement and chromium oxide being, respectively 12 – 25 and 3 – 15% by weight per total amount of the refractories, in which said castable refractories contain 5 – 25% in weight of chamotte having a particle size of 0.8 – 5.0 cm$^3$ in volume.

4 Claims, No Drawings

CASTABLE REFRACTORIES FOR THE USE OF AN IMPELLER TO STIR MOLTEN PIG IRON TO WHICH AN ALKALINE ADDITIVE IS ADDED

The present invention relates to castable refractories for the use as an impeller to stir molten pig iron to which an alkaline additive is added.

For instance, in desulfurizing molten pig iron under the addition of a desulfurizer in a suitable vessel, the desulfurization effect depends on the kind of desulfurizer, the amount of the desulfurizer, the temperature of treating pig iron, the composition of pig iron and other factors. To improve the desulfurization effect, it is necessary to sufficiently contact the desulfurizer with molten pig iron sufficiently. Thus, it is important to enlarge the contact area between the molten pig iron and the desulfurizer as much as possible.

For such a purpose, the use of an impeller to stir the molten pig iron is effective, and in connection therewith, the durability of the refractories to protect the impeller is an important problem from the technical and economical points of view.

As a result of various investigations on suitable refractories to protect the impeller for use in stirring said molten pig iron, the present inventors developed previously castable refractories having excellent resistance against alkaline corrosion and suitable, for instance, for stirring pig iron to which an alkali or alkaline earth compound, such as, caustic soda, soda ash and calcium carbide is added as a desulfurizer. Thus, Japanese Patent Application, Sho 42-11403 (Japanese Patent Publication, Sho 46-30285) relates to castable refractories for the use as an impeller to stir molten pig iron to which an alkaline additive is added comprising chamotte obtained by burning fire clay consisting chiefly of kaolinite and a proper amount of aluminous cement; and Japanese Patent Application Sho 44-95035 (an application divided from said Japanese Patent Application Sho 42-11403) relates to castable refractories for the use of an impeller to stir molten pig iron to which an alkaline additive is added comprising chamotte obtained by burning fire clay consisting chiefly of kaolinite, a proper amount of aluminous cement and at the same time, in order to improve the resistance against alkaline corrosion, 3 – 15% in weight of chromium oxide in fine powder form.

While such castable refractories are satisfactory in resistance against alkaline corrosion at higher temperatures, it is observed in some instances that the structural product obtained therefrom are lacking in sufficient mechanical strength bear up under the stream of molten pig iron during stirring.

The object of the present invention is to eliminate the defect in the mechanical strength and to offer refractories with sufficient strength to bear the stream of molten pig iron during stirring.

The invention comprises castable refractories for use as an impeller to stir molten pig iron to which an alkaline additive is added comprising chamotte and aluminous cement, said chamotte being obtained by burning fire clay consisting chiefly of kaolinite and the amount of said aluminous cement being 12 –25% by weight per total amount of the castable refractories (hereinafter, all the amount of components in the refractories are expressed in weight percentage per total amount of the refractories), characterized in which said castable refractories contain 5 –25% of chamotte having a particle size of 0.8 – 5.0 cm$^3$ in volume.

Secondly, the invention is a castable refractory for use as an impeller to stir molten pig iron to which an alkaline additive is added comprising chamotte, aluminous cement and, at the same time, chromium oxide in fine powder form, said chamotte being obtained by burning fire clay consisting chiefly of kaolinite and the amounts of said aluminous cement and chromium oxide being, respectively, 12 – 25 and 3 – 15% per total amount of the refractories, characterized in which said castable refractories contain 5 – 25% of chamotte having a particle size 0.8 – 5.0 cm$^3$ in volume.

The invention will be explained in detail in the following.

The chamotte obtained by burning fire clay consisting chiefly of kaolinite used in this invention (which will be referred to as chamotte hereinafter) comprises approximately 49 – 54% of $SiO_2$ and 42 – 48% of $Al_2O_3$. The chamotte desirably possesses a relatively low porosity. The aluminous cement used comprises approximately less than 4% of $SiO_2$, 50 – 80% of $Al_2O_3$ and 17 – 35% of $CaO$. The chromium oxide used possesses a purity higher than 97% and a particle size smaller than 0.05 mm.

The present invention provides increased mechanical strength at higher temperatures, in addition to resistance against alkaline corrosion of the structural product obtained from castable refractories comprising chamotte and 12 – 25% of aluminous cement, or comprising chamotte, 12 – 25% of aluminous cement and 3 – 15% of chromium oxide, by providing in the castable refractories 5 – 25% of chamotte having a particle size 0.8 – 5.0 cm$^3$ in volume.

In using such castable refractories to obtain a structural product, it is desirous to add a minimum amount of water necessary for the hydration of the aluminous cement and to give a proper moisture content. The amount of water necessary in working the inventive castable refractories containing relatively coarse chamotte particles as above-mentioned lies suitably in the range of 0.4 – 0.7 times the amount of aluminous cement contained in the refractories. The mixture is, after kneading sufficiently, worked up to a structural product with a desired shape.

When the particle size of the chamotte in the inventive castable refractories becomes smaller than 0.8 cm$^3$ in volume, the ratio of water to aluminous cement in the working increases, and the strength of the structural product obtained from such castable refractories at higher temperatures decreases and the loss in mechanical strength becomes larger.

On the other hand, when the particle size of chamotte in the castable refractories becomes larger than 5.0 cm$^3$ in volume, the particles are too large to form a structural product with a uniform strength, and segregation of the particles in the mixture takes place, and consequently, localized loss of the refractories in slagging takes place and the durability decreases.

When the amount of chamotte having a particle size 0.8 – 5.0 cm$^3$ in volume is less than 5% in the inventive refractories, no distinct improvement in the compressive as well as the bending strength is attained, and the amount of water in the working can not be reduced.

On the other hand, in increasing the amount of said chamotte above 25%, holes are formed among the particles and the segregation of particles takes place when the castable refractories are kneaded and cast to obtain a structural product. No particular increase in the strength is also observed in this instance.

From these reasons, chamotte having a definite particle size, 0.8 – 5.0 cm³ in volume, is adopted as the proper amount.

As for aluminous cement added to the chamotte, a premise in the present invention, when the amount is less than 12%, it is difficult to maintain the ratio of water to aluminous cement at a level less than 0.7 during the working; and, when the amount exceeds 25%, the amount of aluminous cement becomes too large as compared with the aggregate such as the chamotte, the refractoriness of the fine powder part becomes low and the strength at higher temperatures is reduced.

In connection with the amount of water to be added in working said castable refractories, when the ratio of water to aluminous cement is smaller than 0.4, the kneading water becomes insufficient, the fluidity in the casting or working becomes poor and the hydration of the aluminous cement is insufficient, thus giving a rough structural product. On the other hand, when the ratio of water to aluminous cement exceeds 0.7, the porosity of the structural product obtained becomes high due to the drying or to the burning effect, thus deteriorating the strength thereof.

In adding chromium oxide in the second embodiment, when the amount of chromium oxide is less than 3%, no distinct effect of improving corrosion resistance can be seen; and, when the amount exceeds 15%, the reverse effect appears, such as, the reduction in the strength and the deterioration in the mechanical strength at higher temperatures.

While the chamotte used in this invention comprises, as already mentioned, approximately 49 – 54% of $SiO_2$ and 42 – 48% of $Al_2O_3$, up to 60% of $Al_2O_3$ is effective in the inventive castable refractories. Consequently, up to about 20% of a material consisting chiefly of aluminum oxide, such as fused alumina, with a purity higher than 95.0%, may be added so long as the condition that 5 – 25% of chamotte having a particle size 0.8 – 5.0 cm³ in volume is contained in the castable refractories.

Examples of the invention will be set forth in the following.

The raw materials used were a chamotte comprising 52.0% of $SiO_2$ and 45.0% of $Al_2O_3$, an aluminous cement comprising 5.0% of $SiO_2$, 55.0% of $Al_2O_3$ and 36.5% of CaO, and chromium oxide containing more than 99% of $Cr_2O_3$. These materials were mixed in the mixing proportion as shown in Table 1 to obtain castable refractories. The structural products obtained therefrom were tested according to the strength testing method in JISR - 2553. The results were as in Table 1.

To compare the inventive examples, No. 1 – 9, with the comparison examples, No. 10 – 17, in Table 1, it is obvious firstly, that the high temperature mechanical strength in the inventive examples, in which 5 – 25% of chamotte having a particle size 0.8 – 5.0 cm³ in volume is contained in the castable refractories, is remarkably improved. The amount of working water is also reduced.

In the case of adding chromium oxide, to compare examples 6 and 7, in which 5 – 25% of chamotte having a particle size 0.8 – 5.0 cm³ is contained, with examples 16 and 17 with no addition of coarse chamotte particles, it is obvious that the amount of working water and the ratio of water to aluminous cement are reduced and the mechanical strength at higher temperatures is improved remarkably in the inventive examples.

Samples 8, 9 and 13 are to show the effect of adding fused alumina as a part of the source of aluminium oxide. From the results, it is seen that up to 60% of aluminum oxide in total may be used in the present invention.

Thus, it is concluded from Table 1 that the addition of 5 – 25% of chamotte having a particle size of 0.8 – 5.0 cm³ in volume to the castable refractories is effective to improve various physical properties of the structural product obtained therefrom remarkably. The range of main constituents in the inventive castable refractories to improve the physical properties is $Al_2O_3$ 40 – 60%, $SiO_2$ 25 – 50% and, when chromium oxide is added, $Cr_2O_3$ 3 – 15%.

Among the inventive and conventional castable refractories in Table 1, several samples were shaped to form an impeller for stirring, and they were used respectively to stir 60 t. of molten pig iron (1370°C) in a hot metal car to which 7 kg/t.-pig iron of soda ash was added for the desulfurization for 10 minutes with a revolution of 120 rpm. Their durabilities were as shown in Table 2.

A similar durability test as shown in Table 2 was made in stirring molten pig iron under the addition of 3 kg/t.-pig iron of calcium carbide ($CaC_2$). Other testing conditions were the same as before. The results were as shown in Table 3.

Table 1

| | | Inventive Samples | | | | | | | | |
|---|---|---|---|---|---|---|---|---|---|---|
| | | 1 | 2 | 3 | 4 | 5 | 6 | 7 | 8 | 9 |
| Mixing Ratio | | | | | | | | | | |
| Chamotte | less than 0.8 cm³ | 78 | 75 | 70 | 65 | 62 | 56 | 52 | 50 | 32 |
| | 0.8–5.0 cm³ | 7 | 10 | 15 | 20 | 23 | 20 | 20 | 20 | 20 |
| Fused alumina | less than 0.3 mm | — | — | — | — | — | — | — | 15 | 20 |
| $Cr_2O_3$ | less than 0.05 mm | — | — | — | — | — | 4 | 8 | — | 5 |
| Aluminous cement | | 15 | 15 | 15 | 15 | 15 | 20 | 20 | 15 | 23 |
| Working water % | | 10.2 | 9.9 | 9.3 | 8.7 | 8.3 | 9.7 | 10.0 | 8.2 | 9.4 |
| Water aluminous cement | | 0.68 | 0.66 | 0.62 | 0.58 | 0.55 | 0.49 | 0.50 | 0.55 | 0.41 |

Table 1 — Continued

|  |  | Inventive Samples | | | | | | | | |
|---|---|---|---|---|---|---|---|---|---|---|
|  |  | 1 | 2 | 3 | 4 | 5 | 6 | 7 | 8 | 9 |
| Composition | $Al_2O_3$ % | 47 | 47 | 47 | 47 | 47 | 45 | 43 | 55 | 56 |
|  | $SiO_2$ % | 45 | 45 | 45 | 45 | 45 | 41 | 39 | 37 | 28 |
|  | CaO % | 6 | 6 | 6 | 6 | 6 | 7 | 7 | 6 | 9 |
|  | $Cr_2O_3$ % | — | — | — | — | — | 4 | 8 | — | 5 |
| After drying | Compressive strength kg/cm² | 225 | 240 | 285 | 291 | 295 | 320 | 307 | 312 | 316 |
|  | Bending strength kg/cm² | 59 | 62 | 67 | 68 | 67 | 73 | 65 | 73 | 75 |
|  | Porosity % | 18.1 | 17.8 | 16.3 | 16.0 | 16.0 | 18.2 | 18.5 | 15.9 | 18.2 |
| Bending strength at 1400°C kg/cm² |  | 6 | 7 | 8 | 6 | 6 | 7 | 8 | 7 | 8 |
| Loss in slagging* % |  | 48 | 45 | 42 | 44 | 46 | 18 | 14 | 39 | 15 |

|  |  | Comparison Samples | | | | | | | |
|---|---|---|---|---|---|---|---|---|---|
|  |  | 10 | 11 | 12 | 13 | 14 | 15 | 16 | 17 |
| Mixing ratio | Chamotte less than 0.8 cm³ | 85 | 81 | 58 | 30 | 70 | 50 | 76 | 72 |
|  | Chamotte 0.8–5.0 cm³ | 13 | 4 | 27 | 20 | 20 | 20 | — | — |
|  | Fused alumina less than 0.3 mm | — | — | — | 30 | — | — | — | — |
|  | $Cr_2O_3$ less than 0.05 mm | — | — | — | — | — | — | 4 | 8 |
|  | Aluminous cement | 15 | 15 | 15 | 20 | 10 | 30 | 20 | 30 |
| Working water % |  | 10.8 | 10.7 | 7.7 | 9.6 | 9.0 | 10.5 | 11.2 | 11.5 |
| Water aluminous cement |  | 0.72 | 0.71 | 0.51 | 0.48 | 0.90 | 0.35 | 0.56 | 0.58 |
| Composition | $Al_2O_3$ % | 47 | 47 | 47 | 63 | 46 | 48 | 45 | 43 |
|  | $SiO_2$ % | 45 | 45 | 45 | 27 | 47 | 38 | 41 | 39 |
|  | CaO % | 6 | 6 | 6 | 7 | 4 | 11 | 7 | 7 |
|  | $Cr_2O_3$ % | — | — | — | — | — | — | 4 | 8 |
| After drying | Compressive strength kg/cm² | 197 | 202 | 288 | 341 | 110 | 495 | 255 | 194 |
|  | Bending strength kg/cm² | 48 | 50 | 55 | 79 | 23 | 88 | 51 | 45 |
|  | Porosity % | 18.9 | 18.8 | 16.3 | 17.4 | 17.8 | 19.4 | 19.6 | 20.3 |
| Bending strength at 1400°C kg/cm² |  | 4 | 4 | 3 | 6 | 2 | 0.5 | 5 | 3 |
| Loss in slagging % |  | 59 | 56 | 58 | 55 | 62 | 71 | 28 | 23 |

* Loss in slagging is expressed as weight loss in % when the sample is immersed in a melt comprising 100 parts of pig iron, 5 parts of fluorite and 5 parts of soda ash for 2 hours at 1350°C.

Table 2

| Castable refractories | | | Durability* |
|---|---|---|---|
| Table 1 | No.10 | Fire clay castable | 1 |
| do. | No. 3 | do. | Containing 0.8–5.0 cm³ chamotte particles | 1.5 |
| do. | No.16 | do. | Containing $Cr_2O_3$ | 1.5 |
| do. | No. 6 | do. | Containing 0.8–5.0 cm³ chamotte particles and $Cr_2O_3$ | 2.0 |

* Durability is expressed as a relative value, the life in fire clay castable No. 10 being taken as the standard.

Table 3

| Castable refractories | | | Durability |
|---|---|---|---|
| Table 1 | No.10 | Fire clay castable | 1 |
| do. | No. 8 | do. | Containing 0.8–5.0 cm³ chamotte particles and fused alumina | 1.3 |
| do. | No.17 | do. | Containing $Cr_2O_3$ | 1.4 |
| do. | No. 7 | do. | Containing 0.8–5.0 cm³ chamotte particles and $Cr_2O_3$ | 1.7 |

What is claimed is:

1. Castable refractories for use as an impeller to stir molten pig iron to which an alkaline additive is added consisting essentially of chamotte and aluminous cement, said chamotte being obtained by burning fire clay consisting essentially of kaolinite, the amount of said aluminous cement being 12–25% by weight per total amount of the refractories, in which said castable refractories contain 5–25% by weight of chamotte having a particle size of 0.8 – 5.0 $cm^3$ in volume.

2. Castable refractories for use as an impeller to stir molten pig iron to which an alkaline additive is added consisting essentially of chamotte, aluminous cement and chromium oxide in fine powder form, said chamotte being obtained by burning fire clay consisting essentially of kaolinite, the amounts of said aluminous cement and chromium oxide being, respectively, 12 – 25 and 3 – 15% by weight per total amount of the refractories, in which said castable refractories contain 5–25% by weight of chamotte having a particle size of 0.8 – 5.0 $cm^3$ in volume.

3. Castable refractories for the use of an impeller to stir molten pig iron as set forth in claim 1 by which up to 20% in weight of a material consisting essentially of aluminium oxide is added.

4. The castable refractory of claim 2 wherein up to 20% by weight of a material consisting essentially of aluminum oxide is added.

* * * * *